United States Patent
Li

(10) Patent No.: US 8,964,599 B2
(45) Date of Patent: Feb. 24, 2015

(54) BASE STATION AND METHOD FOR STORING CODE STREAMS OF BROADCASTING INFORMATION

(75) Inventor: Guowen Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 507 days.

(21) Appl. No.: 13/258,089

(22) PCT Filed: Apr. 21, 2010

(86) PCT No.: PCT/CN2010/071970
§ 371 (c)(1),
(2), (4) Date: Feb. 20, 2012

(87) PCT Pub. No.: WO2011/020336
PCT Pub. Date: Feb. 24, 2011

(65) Prior Publication Data
US 2012/0134295 A1    May 31, 2012

(30) Foreign Application Priority Data
Aug. 21, 2009    (CN) .......................... 2009 1 0169226

(51) Int. Cl.
*H04W 4/00*    (2009.01)
*H04W 48/08*   (2009.01)
*H04L 12/18*   (2006.01)
*H04W 4/06*    (2009.01)

(52) U.S. Cl.
CPC ............. *H04W 48/08* (2013.01); *H04L 12/189* (2013.01); *H04W 4/06* (2013.01)
USPC ........... 370/254; 370/328; 370/412; 370/474; 455/509; 455/434; 712/204

(58) Field of Classification Search
USPC .......... 370/254, 328, 474; 455/434, 509, 466, 455/418, 561; 712/204
See application file for complete search history.

(56) References Cited

U.S. PATENT DOCUMENTS 6,628,946 B1    9/2003   Wiberg et al.
2002/0065091 A1*  5/2002   Choi .............................. 455/509

(Continued)

FOREIGN PATENT DOCUMENTS

CN    1371576 A    9/2002
CN    1770741 A    5/2006

(Continued)

OTHER PUBLICATIONS

International Search Report on international application No. PCT/CN2010/071970, mailed on Jul. 15, 2010.

(Continued)

*Primary Examiner* — Vincelas Louis
(74) *Attorney, Agent, or Firm* — Oppedahl Patent Law Firm LLC

(57) ABSTRACT

A method and a base station for storing code streams of broadcasting information are disclosed. The method includes the steps that: a base station reads configuration information to be broadcasted, fills the parameter information of the configuration information in the structure corresponding to the broadcasting information, encodes the broadcasting information to generate code streams and then stores the code streams; wherein during the storing step, the base station stores each piece of System Information (SI) of the broadcasting information in a format of code streams, the stored SI includes both the length of SI and the SI code streams. With the present disclosure, broadcasting information is stored in a format of code streams, thus the memory is saved extremely; each SI is stored in an identical storing area, thus the storage space is saved furthest and the efficiency is improved.

6 Claims, 3 Drawing Sheets

(56) References Cited

U.S. PATENT DOCUMENTS

| | | |
|---|---|---|
| 2006/0094469 A1 | 5/2006 | Kondo |
| 2007/0260851 A1* | 11/2007 | Taha et al. .................... 712/204 |
| 2008/0188266 A1* | 8/2008 | Carter et al. ................. 455/561 |
| 2008/0212522 A1 | 9/2008 | Ko et al. |
| 2009/0098892 A1* | 4/2009 | Trogolo et al. ............... 455/466 |
| 2011/0269443 A1* | 11/2011 | Farnsworth et al. .......... 455/418 |

FOREIGN PATENT DOCUMENTS

| | | |
|---|---|---|
| CN | 1842082 A | 10/2006 |
| CN | 101119173 A | 2/2008 |
| JP | 2001177567 A | 6/2001 |
| JP | 2006522518 A | 9/2006 |
| WO | 2007049551 A1 | 5/2007 |
| WO | 2008091223 A1 | 7/2008 |

OTHER PUBLICATIONS

English Translation of the Written Opinion of the International Search Authority in international application No. PCT/CN2010/071970, mailed on Jul. 15, 2010.

3GPP TS25.331, V8.7.0, pp. 1409-1411 Jun. 2009.

\* cited by examiner

BASE STATION AND METHOD FOR STORING CODE STREAMS OF BROADCASTING INFORMATION

TECHNICAL FIELD

The disclosure relates to the field of Long Term Evolution (LTE) communication systems, and in particular to a base station and a method for storing code streams of broadcasting information.

BACKGROUND

The broadcasting information is mainly configured to provide cell parameter information of an access network system and is messaged to the User Equipment (UE) in a form of broadcast. The broadcasting information of the Evolved Universal Terrestrial Radio Access Network (E-UTRAN) is broadcasted to the UE in a cell; then the UE obtains, by receiving the broadcasting information, enough access information which is convenient for the UE and the E-UTRAN to establish a radio connection there-between. The process of the UE obtaining the broadcasting information sent from the E-UTRAN is as shown in FIG. 1.

Broadcasting information is divided into a Master Information Block (MIB) and other System Information Blocks (SIB) to be broadcasted. There are totally 11 SIBs in the LTE broadcasting information, specifically, SIB1, SIB2, SIB3, SIB4, SIB5, SIB6, SIB7, SIB8, SIB9, SIB10 and SIB11, wherein each SIB has a different function, as shown in Table 1.

TABLE 1

SIB function description

| Classification | Function |
| --- | --- |
| MIB | Transmitting several key information on a BCH (broadcasting information) |
| SIB1 | Including the relevant information for UE accessing to cell and the scheduling information, of SI etc. |
| SIB2 | Including much public radio resource configuration information |
| SIB3 | Including much public cell reselection information |
| SIB4 | Including co-frequency neighboring cell reselection information |
| SIB5 | Including pilot-frequency neighboring cell reselection information (E-UTRA) |
| SIB6 | Including UTRA neighboring cell reselection information |
| SIB7 | Including GERAN neighboring cell reselection information |
| SIB8 | Including CDMA2000 neighboring cell reselection information |
| SIB9 | Including HNBID information |
| SIB10 | Including ETWS high-priority notification information |
| SIB11 | Including ETWS second-priority notification information |

MIB and all SIBs must be encoded by Abstract Syntax Notation.1 (ASN.1) before they are sent; the encoded MIB and SIBs form corresponding code streams which are transmitted in a form of broadcast. After receiving the code streams, the UE performs ASN.1 decoding to obtain relevant cell parameters.

System Information (SI) is a sub-group consisting of a plurality of SIBs. The scheduling of SIB information is performed with SI as a unit; the SIBs in the same scheduling period can be mapped to one SI; however, each SIB can be mapped only once. Except MIB and SIB1, the other SIBs can only be scheduled to send when mapped to SI.

In the specific implementation, there exist the following problems:

1): In the design implementation, the broadcast cell parameters must be stored for the convenience of determination in the following updating process of the broadcasting information. Since broadcasting information might change due to the modification of is the background configuration, it is necessary to reorganize the broadcasting information code streams and send a paging message to inform the UE. The storage of enormous broadcasting cell parameters will waste memory extremely.

2): If SI changes, it is necessary to modify the Value Tag in SIB1. If the broadcasting information changes, however, the Value Tag is not modified when the broadcasting information is sent, then the UE can not receive the SI information. If the broadcasting information does not change, however, the Value Tag is modified when the broadcasting information is sent, then, the UE receives broadcast, thus the UE wastes power. The Value Tag is an identifier for indicating whether the SI changes or not. However, if the broadcasting information is stored in a format of SIB structure, the determination on whether the SI changes is complicated and the efficiency is low.

3): The process of the pointer cell, especially the pointer list, in the SIB structure is extremely inconvenient, even if a memory is to be allocated for the pointer structure, the memory is difficult to be released, it has to distinguish the conditions of releasing or not releasing, therefore, memory leakage is easily caused. Besides, when determining whether the broadcasting information is updated, it has to compare the SIB cells so determine whether a change happens, because the pointer member might cause the is design difficult to implement.

4): The broadcasting flow of broadcasting information is simple. However, the implementation is very troublesome and is inconvenient to maintain, further, the process efficiency is low.

To sum up, when the broadcasting information is stored in a format of SIB structure, the problems mentioned above are difficult to be solved. In addition, the memory is wasted.

SUMMARY

The technical problem to be solved in the disclosure is to provide a base station and a method for storing code streams of broadcasting information, which extremely save the storage space of broadcasting information, simplify process flow, are efficient to optimize and convenient to maintain.

In order to solve the problem above, the disclosure provides a method for storing code streams of broadcasting information, the method comprises the steps that: a base station reads configuration information to be broadcasted, fills the parameter information of the configuration information in the structure corresponding to the broadcasting information, encodes the broadcasting information to generate code streams and then stores the code streams; wherein during the storing step, the base station stores each SI of the broadcasting information in a format of code streams, and the stored SI includes both a length of SI and the SI code streams.

In the step that each SI is stored in a format of code streams, the SI code stream section may include a head section and code streams of each SIB mapped to the SI;

wherein the base station stores each SI in an identical storing area, and each stored SI is arranged in order so as to form an SI code stream structure; the stored SI code stream structure may further include an SI total number section.

The SI total number section may occupy one byte;

the length section of each SI may occupy two bytes; the length of the SI code stream section is the sum of the length of the SI head section and the length of the code streams of all SIBs mapped to the SI.

The storing step may comprise steps of that: encoding the MIB and the SIB1 of the broadcasting information, and storing the encoded MIB and SIB1 in a format of code streams;

the stored MIB may include the length of MIB and the code streams of MIB, wherein the length of MIB occupies one byte;

the stored SIB1 may include the length of SIB1 and the code streams of SIB1, wherein the length of SIB1 occupies one byte.

the base station storing the updated SI after the broadcasting information is updated, and then determining whether the SI code streams after updating and the SI code streams before updating are the same starting from a first stored SI code stream, if the updated SI code streams and SI code streams before updating are the same, the base station continues to compare the code streams of a next SI before and after updating; if the updated SI code streams are different from the code streams before updating, the base station modifies the Value Tag in SIB1.

The disclosure further provides a base station for storing code streams of broadcasting information, comprising an encoding module, a filling module and a storing module;

the encoding module is configured to encode the broadcasting information to generate encoded code streams and send the encoded code streams to the filling module;

the filling module is configured to store the received code streams into the storing module;

the storing module is configured to store each code stream;

the filling module is further configured to store each SI of the broadcasting information in a format of streams, wherein the stored SI includes a length of SI and the SI code streams.

The filling module may be configured as that:

the SI code stream section includes a head section and code streams of each SIB mapped to the SI;

the filling module stores each SI into an identical storing area of the storing module, wherein each stored SI is arranged in order so as to form an SI code stream structure;

the stored SI code stream structure may further include an SI total number section.

The SI total number section may occupy one byte;

the length section of each SI may occupy two bytes; the length of the SI code stream section is the sum of the length of the SI head section and the length of the code streams of all SIBs mapped to the SI.

The filling module may be further configured to:

store MIB in a format of code streams, wherein the stored MIB includes the length of MIB and the code streams of MIB, and the length of MIB occupies one byte; and store SIB1 in a format of code streams, wherein the stored SIB1 includes the length of SIB1 and the SI code streamsB1, and the length of SIB1 occupies one byte.

The filling module is further configured to: store the updated SI after the broadcasting information is updated, and determine whether the updated SI code streams and the SI code streams before updating are the same starting from the first stored SI code stream, continue to compare the updated code streams of a next SI with those before updating when the updated SI code streams and the SI code streams before updating are the same, and modify the Value Tag in SIB1 when the updated SI code streams are different from the code streams before updating.

The disclosure provides a base station and a method for storing code streams of broadcasting information, for storing the broadcasting information in a format of code streams, thereby saving a lot of memory; besides, each SI is stored in an identical storing area; therefore, the storage space is greatly saved. In addition, according to the storing mode provided by the disclosure, when the broadcasting information changes, the comparison process of the new SI with the old SI is simplified, the optimization is efficient and the maintenance is convenient.

DETAILED DESCRIPTION

Figure 2:
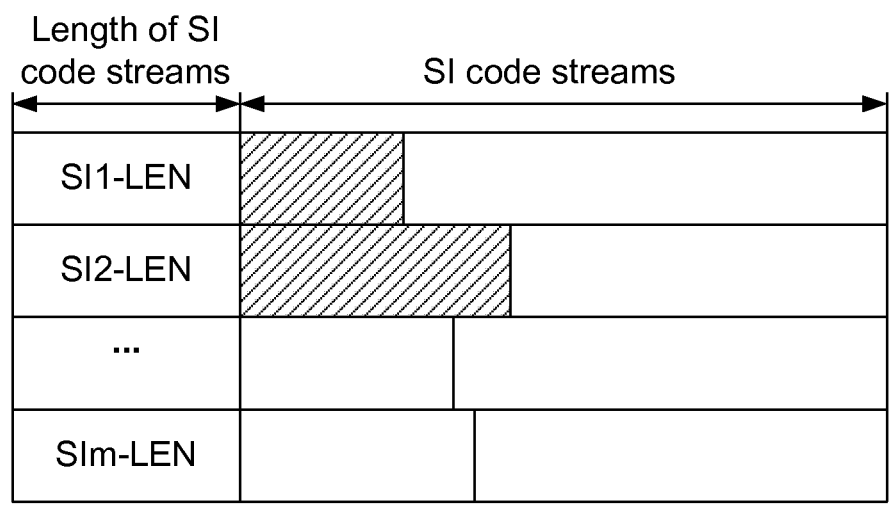
FIG. 2 illustrates a schematic diagram for storing each SI in a format of code streams according to the disclosure.
Figure 3:
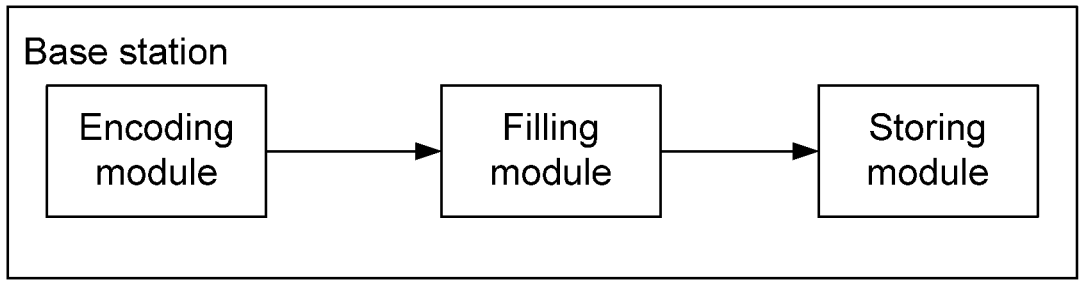
FIG. 3 illustrates a structural diagram of the base station according to the disclosure.
Figure 4:
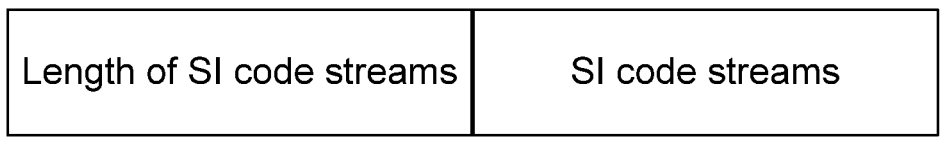
FIG. 4 illustrates a method for storing SI code streams according to the disclosure.
Figure 5:
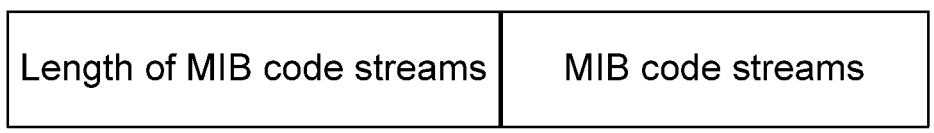
FIG. 5 illustrates a method for storing MIB code streams according to the disclosure.
Figure 6:
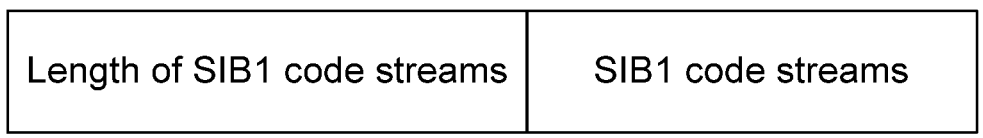
FIG. 6 illustrates a method for storing SIB1 code streams according to the disclosure.
Figure 7:
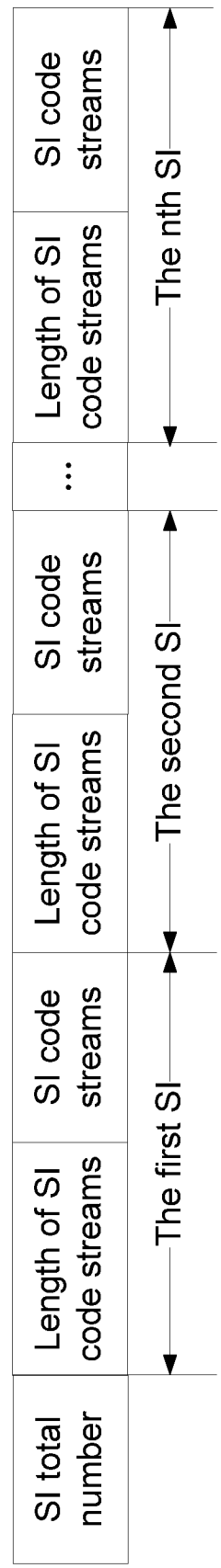
FIG. 7 illustrates an optimized method for storing SI code streams according to the disclosure.

The embodiment provides a base station for storing code streams of broadcasting information, as shown in FIG. 3, the base station comprises an encoding module, a filling module and a storing module;

the encoding module is configured to encode the broadcasting information according to the scheduling information, including step of encoding MIB to obtain MIB code streams, encoding SIB1 to obtain SIB1 code streams and step of encoding other SIBs (e.g. one or more of SIB2 to SIB11) to be broadcasted to obtain SIBi code streams, wherein $2 \leq i \leq 11$, and the encoding module is further configured to send each encoded code stream to the filling module;

the filling module is configured to receive each encoded code stream and store each code stream into the storing module; specifically comprises steps of:

storing MIB code streams into the storing module in a format of code streams, wherein the stored MIB code streams are as shown in FIG. 5, including two sections, namely, MIB-LEN and MIB-STREAM, in which, MIB-LEN occupies one byte and indicates the length of MIB code streams; MIB-STREAM indicates the code streams of MIB;

storing SIB1 code streams into the storing module in a format of code streams, wherein the stored SIB1 code streams are as shown in FIG. 6, including two sections, namely, SIB1-LEN and MIB1-STREAM, in which, SIB1-LEN occupies one byte and indicates the length of SIB1 code streams; MIB1-STREAM indicates the code streams of SIB1; and mapping SIBi in accordance with mapping rules, wherein one SIB code stream can map to one SI or a plurality of SIB code streams can map to the same SI.

Wherein the SI formed after mapping is as shown in FIG. 2, the storage space allocated to each SI can accommodate the code streams of all SIBs from SIB2 to SIBn; after stored in a format of code streams, each SI includes two sections, namely, SI-LEN and SI-STREAM, in which, SI-STREAM includes the length of SI head section and code streams of each SIB mapped to SI; compared with the method for storing SI in a format of structure in the prior art, the method for storing SI in a format of code streams greatly saves the storage space; however, the latter storing method still wastes a part of storage space, as shown in FIG. 2, the oblique line part is the area filled with SIB code streams, the blank area is the area not filled with SIB code streams, in this way, the storage space allocated to each SI will have some blank areas; therefore, in order to save the storage space to the full extent, the filling module can store each SI by the method shown in FIG. 7, specifically, the filling module stores each SI in an identical storing area of the storing module, wherein each stored SI is arranged in order so as to form an SI code stream structure, as shown in FIG. 7, a single SI still is in a format of code streams; as shown in FIG. 4, SI-LEN occupies two bytes and indicates the length of SI code streams, however, the length of SI-STREAM changes relative to FIG. 2. Herein the length of SI-STREAM is the length of the encoded SI, which includes the sum of the length of SI head section and the length of code streams of each SIB mapped to SI, therefore, the blank area shown in FIG. 2 does not exist and the storage space is further saved; the stored SI code stream structure further includes an SI total number section which occupies one byte.

The filling module is further configured to compare the SI stored this time with the SI stored last time to determine whether a change happens after storing the SI last time, the comparison mode might be but not limited to the following: setting a pointer for the filling module, the comparing starts from the first stored SI code stream, if the code streams stored this time and last time are the same, backwards moving the pointer to compare the code streams of a next SI, if the code streams stored this time and last time are different, it is indicated that a change happens between the SI stored this time and the SI stored last time;

the filling module is further configured to modify the Value Tag in SIB1 code streams when the stored SI changes;

the storing module is configured to store MIB code streams, SIB1 code streams and SI.

The embodiment provides a method for storing broadcasting information, which applies an optimized cache method to store the broadcasting information code streams encoded with ASN.1 encoding. The cache method for MIB is as shown in FIG. 5; the cache method for SIB1 is as shown in FIG. 6; the cache method for SI can store according to the method as shown in FIG. 2 or can store according to the optimized method as shown in FIG. 7, the specific steps are as follows:

Step 101: an Evolved NodeB (eNB) reads configuration information to be broadcasted by the background;

wherein the configuration information includes parameter information required for filling the broadcasting information and scheduling information.

Step 102: according to the scheduling information configured by the background, such as the information that the SIB is to be broadcasted and how to map SIB to SI, the parameter information is filled into the structure corresponding to the broadcasting information respectively, the parameter information including the SIB cell parameter to be broadcasted; wherein MIB, SIB2, SIB2 must be broadcasted.

Step 103: the eNB encodes the MIB with ASN.1 encoding and caches the encoded MIB code streams, wherein the storing method of MIB code streams is as shown in FIG. 5, the MIB code streams including MIB-LEN and MIB-STREAM, in which, MIN-LEN indicates the length of MIB code streams and occupies one byte; MIB-STREAM indicates the code streams of MIB.

Step 104: the eNB encodes SIB2 to SIBn with ASN.1 encoding and maps the encoded SIB code streams according to the mapping relationship to form SI;

each SI formed after mapping is as shown in FIG. 2, the storage space allocated to each SI can accommodate the code streams of all SIBs from SIB2 to SIBn; after stored in a format of code streams, each SI includes two sections, namely, SI-LEN and SI-STREAM; compared with the method for storing SI in a format of structure in the prior art, the method for storing SI in a format of code streams greatly saves the storage space; however, the latter storing method still wastes a section of storage space, as shown in FIG. 2, the oblique line section is the area filled with code streams, the blank area is the area not filled with code streams, in this way, the storage space allocated to each SI will have some blank areas; therefore, in order to save the storage space to the full extent, the eNB can store each SI by the method shown in FIG. 7, specifically, the eNB stores each SI in an identical storing area of the storing module, wherein each stored SI is arranged in order so as to form an SI code stream structure, as shown in FIG. 7, a single SI still is in a format of code streams; as shown in FIG. 4, SI-LEN occupies two bytes and indicates the length of SI code streams, however, the length of SI-STREAM changes relative to FIG. 2, at this moment, the length of SI-STREAM is the length of the encoded SI, including the sum of the length of SI head section and the is length of code streams of each SIB mapped to SI, therefore, the blank area shown in FIG. 2 does not exist and the storage space is further saved; the stored SI code stream structure further includes an SI total number section, which is finally filled when a single SI is filled and occupies one byte.

Step 105: the eNB encodes the SIB1 with ASN.1 encoding and caches the encoded SIB1 code streams, wherein the storing method of SIB1 code streams is as shown in FIG. 6, the SIB1 code stream includes SIB1-LEN and SIB1-STREAM, in which, SIB1-LEN indicates the length of SIB1 code streams and occupies one byte; the SIB1-STREAM indicates the code streams of SIB1.

After the broadcasting information is updated, the eNB stores the SI code streams by the method above and then has to determine whether the new SI code streams are changed relative to the old SI code streams, the determination method might be but not limited to the following: setting a pointer, comparing the new SI code streams with the old SI code streams to determine whether they are the same starting from the first stored SI, if the new code stream and the old code stream are the same, moving the pointer to a next SI, and comparing whether the new and old SI code streams of the next SI are the same, if the new and old code streams are different, it is indicated that a change happens to the SI stored this time and the Value Tag of SIB1 has to be modified; then encoding SIB1 and storing the encoded SIB1.

The storing method as shown in FIG. 7 is to allocate a storage space for all SIs, each SI is filled in order so as not to waste storage space.

Figure 1:
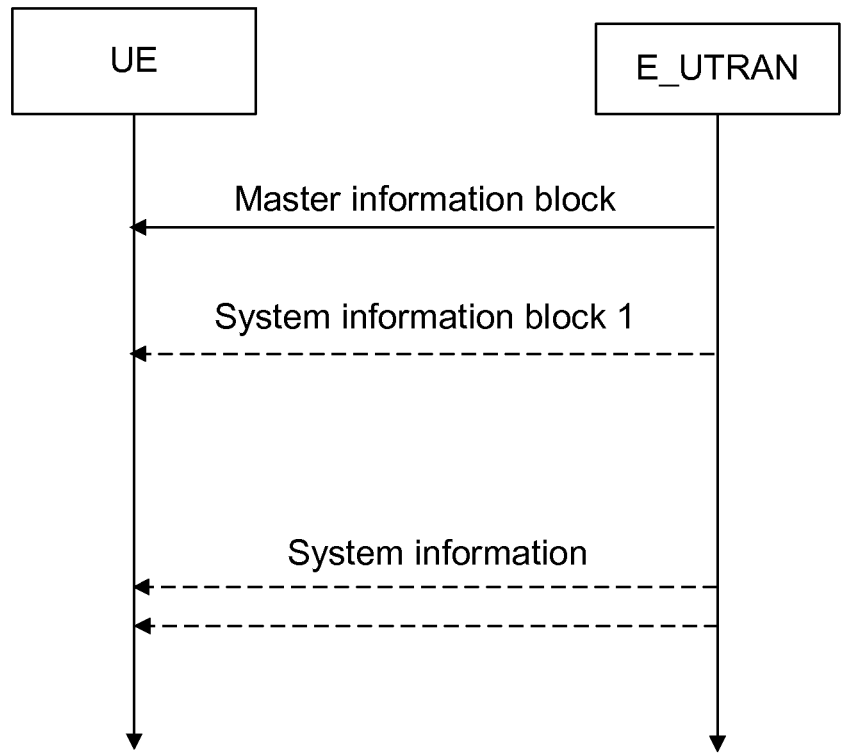
FIG. 1 illustrates a process of UE obtaining the broadcasting information sent from the E-UTRAN.

Step 106: transmitting broadcasting information; as shown in FIG. 1, the broadcasting information is transmitted successfully and the UE can obtain the broadcasting information.

After applying the optimized code stream cache method, the pointer structure in the SIB cell is easy to be processed and can be released after encoding, only the code stream information is stored, therefore, the possibility of memory leakage is avoided. In case of one cell, taking SIB2-SIB8 for example, 49K bytes of memory is needed for storing SIB cell structure; after applying this optimized storing solution, 500 bytes of memory is needed for storing code streams, the memory used is just about 1% of the originally used memory, therefore, the memory is greatly saved. The program process flow is simplified, has high efficiency and is convenient to maintain.

INDUSTRIAL APPLICABILITY

The disclosure provides a base station and a method for storing code streams of broadcasting information, for storing broadcasting information in a format of code streams, thereby extremely saving memory; besides, each SI is stored in an identical storing area; therefore, the storage space is greatly saved. In addition, according to the storing mode provided by the disclosure, when the broadcasting information changes, the comparison process of the new SI with the old SI is simplified, the optimization is efficient and the maintenance is convenient.

What is claimed is:

1. A method for storing code streams of broadcasting information, comprising the steps of:
a base station reads configuration information to be broadcasted, fills parameter information of the configuration information in a structure corresponding to the broadcasting information, encodes the broadcasting information to generate code streams and then stores the code streams;
wherein during the step of the base station stores the code streams, the base station stores each piece of System Information (SI) of the broadcasting information in a format of code streams, and the stored SI includes both a length section of SI and a SI code stream section;
wherein during the step of the base station stores each piece of said System Information (SI) of the broadcasting information in said format of code streams, the SI code stream section includes a head section and code streams of each System Information Block (SIB) mapped to the SI;
the base station stores each said SI in an identical storing area, and each said stored SI is arranged in order, so as to form an SI code stream structure; and
the stored SI code stream structure further includes an SI total number section; and
wherein said SI total number section occupies one byte;
the length section of each said SI occupies two bytes; and
the length of the SI code stream section is a sum of a length of the SI head section and a length of the code streams of all SIBs mapped to the SI.

2. The method according to claim 1, wherein the step of the base station stores the code streams comprises:
storing an encoded Master Information Block (MIB) and a first SIB in a format of code streams;
the stored MIB includes a length of the MIB and the code streams of the MIB, wherein the length of the MIB occupies one byte;
the stored first SIB includes a length of the first SIB and the code streams of the first SIB, wherein the length of the first SIB occupies one byte.

3. The method according to claim 1, further comprising the steps of:
the base station stores updated SI code streams after the broadcasting information is updated, and then determines whether the updated SI code streams and old SI code streams before said updating are the same.

4. A base station for storing code streams of broadcasting information, comprising an encoder, a filling device and a memory; wherein
the encoder is configured to encode the broadcasting information to generate encoded code streams and send the encoded code streams to the filling device;
the filling device is configured to store the received code streams into the memory;
the memory is configured to store each code stream; and
the filling device is further configured to store each System Information (SI) of the broadcasting information in a format of code streams, wherein the stored SI includes a length section of SI and a SI code stream section;
wherein the filling device is configured as that:
the SI code stream section includes a head section and code streams of each System Information Block (SIB) mapped to the SI;
each said SI is stored into an identical storing area of the memory, wherein each stored SI is arranged in order so as to form an SI code stream structure; and
the stored SI code stream structure further includes an SI total number section; and
wherein said SI total number section occupies one byte;
the length section of each said SI occupies two bytes; and
the length of the SI code stream section is a sum of a length of the SI head section and a length& of the code streams of all SIBs mapped to the SI.

5. The base station according to claim 4, wherein the filling device is further configured to:
store a Master Information Block (MIB) in a format of code streams, wherein the stored MIB includes a length of the MIB and the code streams of the MIB, and the length of the MIB occupies one byte; and
store a first SIB in a format of code streams, wherein the stored first SIB includes a length of the first SIB and the SI code streams of the first SIB, and the length of the first SIB occupies one byte.

6. The base station according to claim 4, wherein the filling device is further configured to:
store updated SI code streams after the broadcasting information is updated, and-determine whether the updated SI code streams and old SI code streams before said updating are the same.

* * * * *